May 5, 1964
W. S. MILLER
3,131,976
AUTOMATIC SKID CONTROL
Filed July 11, 1960
2 Sheets-Sheet 1
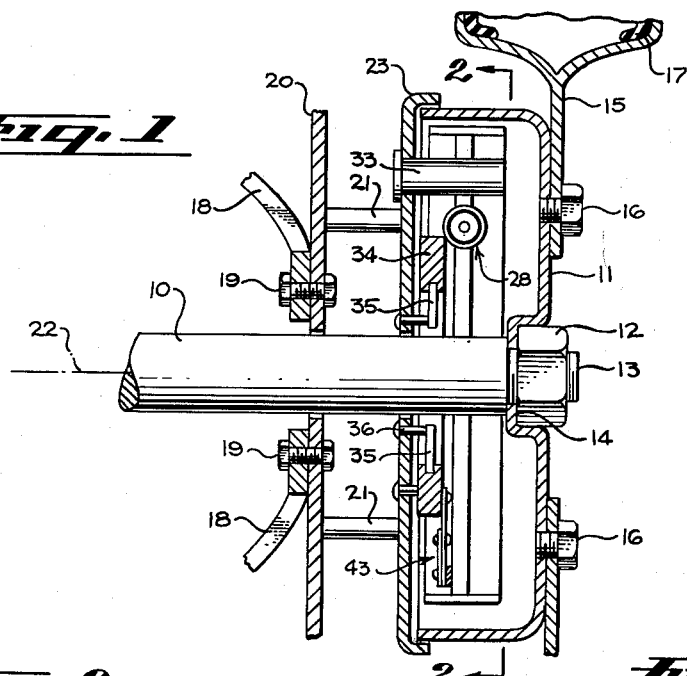
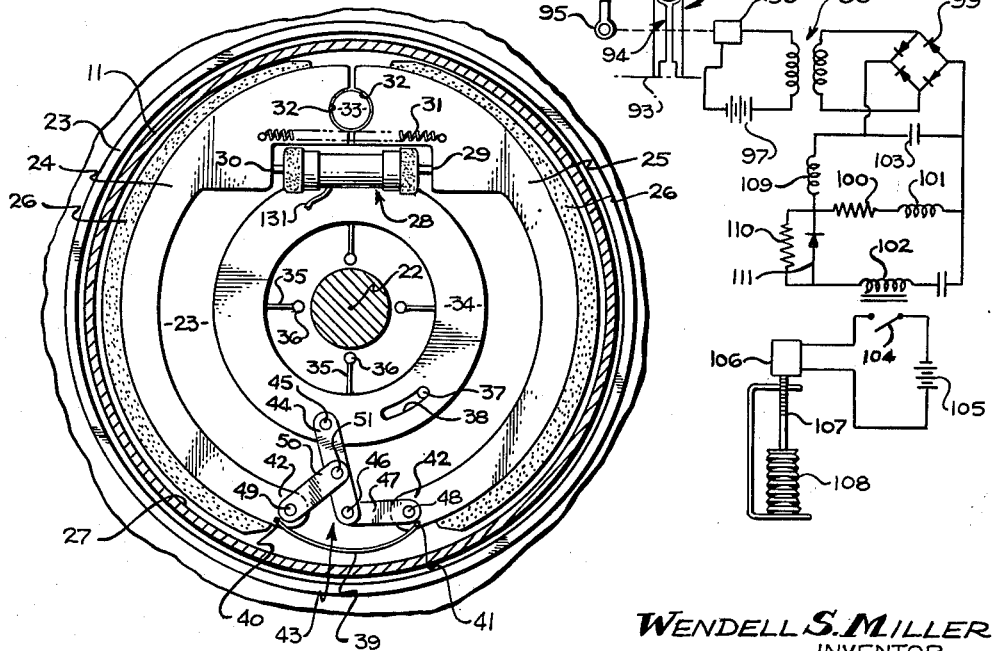
WENDELL S. MILLER
INVENTOR
BY William P. Green
ATTORNEY May 5, 1964   W. S. MILLER   3,131,976
AUTOMATIC SKID CONTROL
Filed July 11, 1960   2 Sheets-Sheet 2

WENDELL S. MILLER
INVENTOR
BY William P. Green
ATTORNEY

United States Patent Office 3,131,976
Patented May 5, 1964

3,131,976
AUTOMATIC SKID CONTROL
Wendell S. Miller, 1341 Comstock Ave.,
Los Angeles 24, Calif.
Filed July 11, 1960, Ser. No. 42,082
4 Claims. (Cl. 303—24)

This invention relates to a unique type of automatic skid control for an automobile or other vehicle.

When the driver of a rapidly moving vehicle finds it necessary to apply the brakes very suddenly, it is often difficult to do so without applying the brakes too abruptly and thereby sending the vehicle into a skid. Once such a skid has started, the resistance to movement of the vehicle offered by the brakes decreases considerably, and the skidding vehicle then can not possibly stop in as short a distance as if no skidding had occurred. This is true because the sliding traction or friction between a skidding wheel and a road surface is not nearly as great as rolling traction between that same wheel and the same road surface. Also, the control which the driver has over the vehicle with regard to lateral sliding is of course lost as soon as skidding commences.

The general object of the present invention is to provide a unique type of brake control which functions automatically to prevent substantial skidding of a vehicle, regardless of how abruptly the operator may apply the brakes. This control system includes means adapted to respond automatically to the sudden loss of rolling traction which accompanies the commencement of a skid, together with means then automatically operable to decrease the braking force exerted by the brakes as soon as the skid commmences. Such automatic and immediate decrease in the braking force allows the wheel or wheels of the vehicle to again gain a proper rolling engagement with the road surface, to thereby stop the skid and allow the operator to maintain control over the vehicle. Each time that the skid recommences, if it does, the braking force is again automatically decreased for a short period, so that an extended skid is never allowed to occur, and the operator is therefore able to bring the vehicle to a stop in a minimum period of time and minimum distance, without danger of over-braking.

It is contemplated that the skid responsive portion of the automatic control apparatus, for responding to the commencement of a skidding condition, may take any of several different forms. For example, this mechanism may be a unit which is adapted to be actuated automatically by a particular predetermined change in deceleration of the vehicle. More specifically, the unit may be designed to respond to a decrease in the deceleration of the vehicle at a predetermined excessive rate, which excessive decrease in deceleration can occur only when a skid commences. To respond to such a condition, I may employ inertia actuated mechanism, including a mass or masses which are operable by changes in inertia or momentum conditions resulting from commencement of a skid. In certain preferred forms of the invention, two masses are employed, with these two masses having different periods of movement when actuated by the commencement of skidding, and with that differential movement of the masses being utilized for controlling the automatic release of the brakes.

In another form of the invention, the skid actuated control mechanism may be adapted to respond to a decrease in braking torque which occurs when skidding commences. Here again, the response to decrease in torque may be attained by inertia actuation of a mass or masses which are shiftable (typically about the axis of one of the wheels) in response to an excessive and sudden decrease in braking torque.

Still another form of the invention responds to the sudden decrease in rate of rotation of a wheel of the vehicle which occurs when a brake locks the wheel against rotation, and the vehicle commences to skid along the road surface.

While it is contemplated that the automatic skid control of the present invention will in most instances be applied to vehicles in which the traction elements for engaging a road surface are wheels, the basic principle of the invention can also be applied, if desired, to vehicles having other types of traction units. For instance, these units may be endless tracks of the type employed on tractors and other similar vehicles.

The above and other features and objects of the present invention will be better understood from the following detailed description of the typical embodiments illustrated in the accompanying drawings in which:

FIG. 1 is a fragmentary axial section through a wheel of a vehicle having an automatic skid control embodying the invention;

FIG. 2 is a transverse section taken on line 2—2 of FIG. 1;

FIG. 6 is a diagrammatic representation of still another form of the invention.

Figure 3:
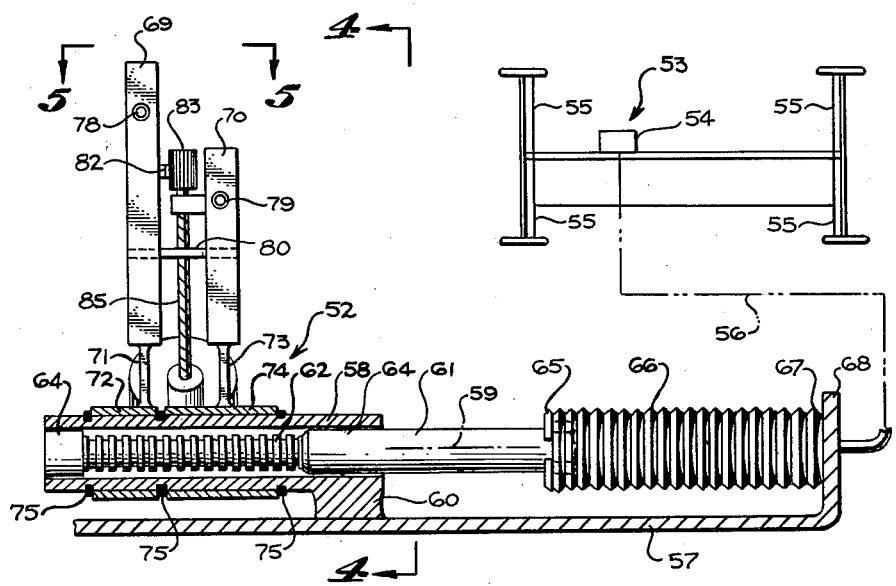
FIG. 3 is a partially diagrammatic representation of a second form of skid control embodying the invention.

Referring first to FIGS. 1 and 2, I have shown fragmentarily a motor vehicle, which may be considered to be conventional in every respect except for the provision of the illustrated automatic skid responsive mechanism in the wheels. FIGS. 1 and 2 are sections taken through one of the wheels, and showing the manner in which the automatic control is added to the normal brake assembly.

The apparatus of FIGS. 1 and 2 will be applied to each of the four wheels of the vehicle. In the figures, I have typically represented one of the rear wheels, having the usual axle or shaft 10 to which the wheel is connected, and by which the wheel is driven from the differential of the vehicle. Axle 10 is attached at its outer end to the usual brake drum represented at 11, the attachment typically being by means of a nut 12 tightened onto an outer threaded portion 13 of the axle, to clamp an inner flange 14 of the brake drum against a shoulder on axle 10. It will of course be understood that the brake drum 11 is keyed in some suitable manner to axle 10 for rotation therewith. Also, the actual wheel 15 of the vehicle is secured by the usual studs and nuts 16 to the brake drum, and carries a tire 17 for engaging and rolling along a road surface.

The elements 18 of FIG. 1 may be considered as representations of portions of the frame structure of the vehicle. To this frame structure there is attached by bolts 19 a rigid mounting plate 20, which carries a series of parallel torsion elements 21 projecting parallel to and spaced about the main axis 22 of axle 10. Elements 21 are rigidly welded or otherwise secured at one end to plate 20, and are similarly welded or otherwise rigidly secured at their opposite ends to the back plate 23 of the brake assembly. This plate 23 may take the form essentially of the usual back plate to which the brake shoes and other non-rotating portions of the brake assembly are mounted.

With reference now to FIG. 2, there are shown at 24 and 25 two essentially conventional brake shoes, having brake bands 26 attached thereto for frictionally engaging and resisting rotation of the inner cylindrical braking surface 27 of brake drum 11. The brake bands are urged against surface 27 by fluid actuation of a piston and cylinder mechanism 28, whose opposite ends bear at 29 and 30 against the two brake shoes 24 and 25. Piston and cylinder mechanism 28 is actuable in conventional manner by hydraulic or pneumatic pressure supplied thereto through a line 131 under the control of a brake pedal. The upper ends of the two shoes are normally urged together by a coil spring represented at 31, and attached at its opposite ends to the two shoes. Rotation of the shoes about the main axis of the wheel is prevented by engagement of two curved surfaces 32 on the shoes with a stop pin 33 attached to and projecting outwardly from stationary plate 23.

For effecting an automatic momentary release of the braking force in response to the commencement of a skid, there is provided within the brake assembly a control mass 34, which desirably takes the form of a ring centered about axis 22. This ring is mounted for limited rotational movement about axis 22, such mounting being typically effected by a series of circularly spaced radially extending leaf springs 35, whose radially inner ends are attached to a series of pins 36 stationarily secured to backing plate 23. The radially outer ends of springs 35 are attached in any desired manner to ring 34, as by extension into and retention within small notches formed in the inner surface of ring 34. Thus, the ring may turn about axis 22 through a limited angle, with that rotational movement being resisted by springs 35 which normally tend to return the weight to the position illustrated in FIG. 2. The ring 34 is desirably free for rotational movement in only one rotary direction relative to backing plate 23, specifically a counterclockwise direction as seen in FIG. 2, if it is assumed that the brake drum 11 and attached wheel also turn in a counterclockwise direction. To control the direction of rotation, plate 23 may carry a pin 37, projecting into an arcuate slot 38 formed in ring 34. Slot 38 is disposed arcuately about main axis 22 of the wheel, and has the pin 37 normally engaged with an end of the slot when the ring it in its FIG. 2 normal position.

The lower ends of the two brake shoes 24 and 25 are normally held relatively firmly in the spaced condition of FIG. 2 by a rather strong leaf spring represented at 39. The opposite ends of this leaf spring are attached at 40 and 41 to the lower ends of the two brake shoes, and will allow spreading of the upper ends of the shoes by fluid actuated unit 28, but will not allow lower ends 42 of the brake shoes to move relatively together under normal braking conditions. However, in the event that ring 34 is actuated (by skidding conditions) in a counterclockwise direction relative to backing plate 23, then the two lower ends 42 of the brake shoes are forced toward one another through a short range of movement, to thereby automatically and momentarily release the braking force. For effecting such actuation of the lower ends of the shoes together, I utilize a linkage 43, including a link or lever 44 pivoted at 45 to ring 34. This lever 44 is pivoted at 46 its opposite end to another link 47, whose second end is pivoted at 48 to the lower end 42 of one of the brake shoes. The corresponding lower end of the other brake shoe is pivoted at 49 to a third link 50, whose second end is pivoted at 51 to link 44 at a location between its opposite ends 45 and 46. By virtue of this linkage, rotational movement of ring 34 relative to backing plate 23 in a counterclockwise direction (as viewed in FIG. 2) will pull the lower ends 42 of the two brake shoes 24 and 25 relatively toward one another.

In describing the operation of the device shown in FIGS. 1 and 2, assume that an automobile equipped with four brake assemblies of the type shown in FIGS. 1 and 2 is travelling along a road at a very rapid rate of speed, and that the operator then finds it necessary to very suddenly apply the brakes of the vehicle. The actuation of the brake pedal by the operator causes pressure fluid to be forced into cylinder 28 through line 131 (in each wheel assembly), so that the piston and cylinder mechanism actuates the upper ends of shoes 24 and 25 relatively apart, to move the brake bands 26 of high friction material into braking engagement with inner surface 27 of the brake drum. Assuming that the brake drum 11 is initially turning in a counterclockwise direction as seen in FIG. 2, the application of braking force by bands 26 to the drum applies a counterclockwise torque to bands 26 and the mounting shoes 24 and 25. This torque is resisted by engagement of the upper end of shoe 25 with stop pin 33, which pin acts to transmit the counterclockwise torque by backing plate 23. Plate 23, in turn, acts to deform torsion rods 21 (FIG. 1) slightly, as a result of the transmission of the mentioned torque from brake 23 to these torsion rods which mount the plate. It is assumed that parts 18 and 20 are sufficiently rigid and strong to remain substantially completely stationary, so that the application of braking force to brake drum 11 results in a substantial deformation of mounting rods 21, and a substantial amount of counterclockwise rotational movement of plate 23 relative to plate 20.

As plate 23 thus turns in a counterclockwise direction, the plate 23 correspondingly turns the associated mass or ring 34 rotatively through the same angular distance. Such movement of the ring 34 is effected by engagement of pin 37 carried by plate 23 with the end of slot 38 in ring 34. Since ring 34 does not move relative to plate 23, upon such initial application of the brakes, the linkage 43 at the lower end of the brake assembly is not actuated.

After such initial application of the brakes, and while the parts 23 and 34 are in their discussed circularly advanced positions, assume that the tire carried by drum 11 commences to skid on the road surface. As soon as rolling traction is lost, the force tending to turn the wheel and drum 11 as a result of the motion of the vehicle will diminish to a very small proportion of its value under rolling friction conditions, and consequently plate 23 will be rapidly returned by resilient torsion rods 21 in a clockwise direction (as viewed in FIG. 2), and to the original position relative to plate 20. Also, plate 23 tends, through leaf springs 35, to return ring 34 with it to the original position thereof. However, ring 34 and its mounting elements 35, considered together with the forces applied by and through linkage 43, are purposely so designed that the inertia of ring 34 will maintain the ring in its circularly advanced position longer than plate 23 remains in its advanced position. That is, plate 23 will return in a clockwise direction to its original position while ring 34 remains in a circularly (counterclockwise) advanced position, and then at a slightly later time ring 34 will also return in a clockwise direction to its original position. Such movement of plate 23 relative to ring 34 is allowed by pin 37, which is free to move a short distance within slot 38 in a clockwise direction. The shoes 24 and 25 of course tend to move with plate 23, and consequently the clockwise movement of plate 23 relative to ring 34 swings the lower end of lever 44 to the left relative to the upper end thereof, to pull the lower ends of the two shoes 24 and 25 relatively together. This action momentarily decreases the braking force applied by brake bands 26 against drum 11, for a period sufficient to allow the tire to again commence its rolling motion along the road surface, and to resume the rolling traction condition. When ring 34 subsequently is returned to its FIG. 2 position relative to plate 23, by the resilience of elements 35 and 39, the whole braking force will again be applied. As will be apparent, the automatic momentary brake releasing action will occur each time that the skid commences, to thus prevent the vehicle from going into an extended skid.

To allow for the above discussed action, it is merely necessary to so construct the various resilient elements 21, 35 and 39 as to give the plate 23 a period of oscillation (rotatively about axis 22) which is much shorter than the corresponding period of ring 34, to thereby assure that plate 23 will always return to its original position before ring 34 returns, upon the initiation of a skid.

The automatic skid control does not in any way affect the braking action of the vehicle under normal driving conditions, but only becomes effective if a skid commences. When the brakes are applied without instituting a skid, the plate 23 and ring 34 both return to their normal positions relatively slowly, and consequently plate 23 is not able to lead the ring in its clockwise returning movement, and spring 39 retains the lower ends of the shoes in their normal spread condition. Preferably, the opposite ends of spring 39 are connected to the shoes by pivotal connections at 40 and 41.

Figure 4:
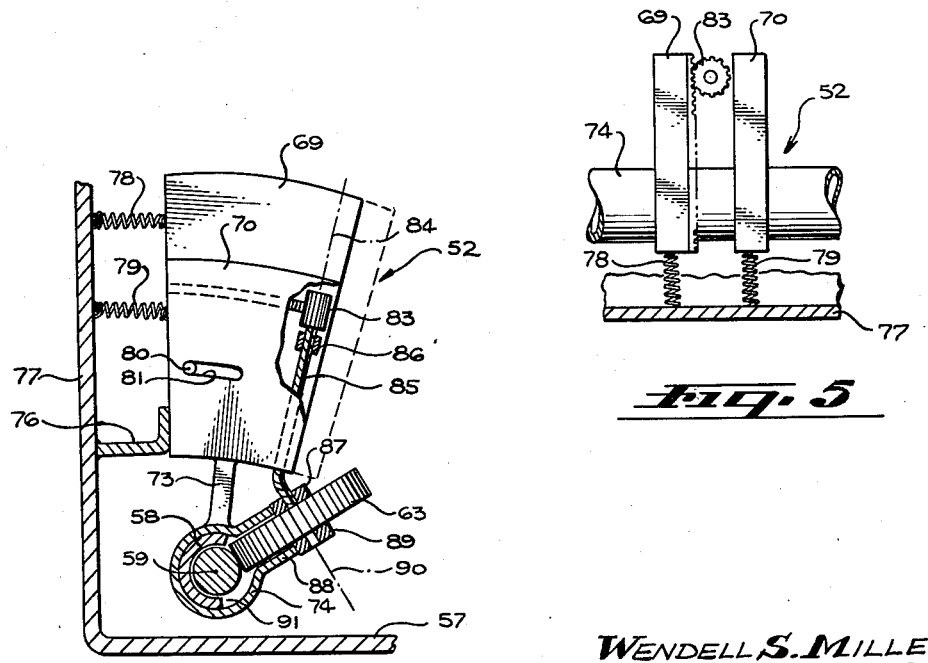
FIG. 4 is a section taken on line 4—4 of FIG. 3.
Figure 5:
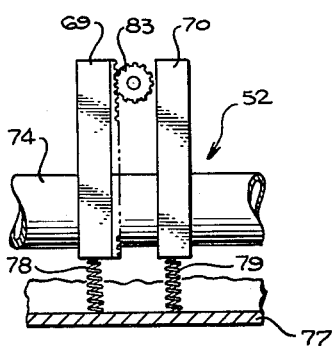
FIG. 5 is a fragmentary section taken on line 5—5 of FIG. 3.

FIGS. 3 through 5 show a second form of the invention which responds to the commencement of a skid in a manner somewhat different from the device discussed above. In FIGS. 3 to 5, I utilize in place of the four separate wheel mounted units of the first device, a single inertia actuated unit 52 mounted to the frame of the vehicle. The hydraulic braking system of the vehicle is diagrammatically represented at 53, and includes the usual master cylinder 54 having four lines 55 leading to the individual hydraulically operated brakes of the four wheels. Unit 52 is connected by a hydraulic line 56 to the braking system, and is adapted upon the initiation of a skid to automatically decrease the fluid pressure in the system momentarily, and thereby momentarily decrease the braking effect.

Unit 52 is typically illustrated as being mounted to a rigid support 57, which is rigidly attached in any suitable manner to the frame of the vehicle.

On the upper surface of part 57, there is mounted a horizontal tube 58, centered about an axis 59 extending transversely of the direction of movement of the vehicle. Tube 58 may be attached rigidly to stationary part 57, as by a mounting post represented at 60. Within tube 58, there is provided an elongated rod or shaft 61, also centered about axis 59, and having a portion 62 presenting a series of axially spaced circular rings forming teeth for engagement by a coacting gear 63. Rod 61 is guided for only axial movement within tube 58, by sliding engagement of cylindrical portions 64 of rod 61 with the inner surface of tube 58. The right end of rod 61 (as seen in FIG. 3) is connected to and actuates the movable end 65 of a flexible bellows 66, whose interior is placed in communication with the fluid of the braking system of the vehicle by line 56. The bellows is of course sufficiently strong to withstand the pressures encountered without deformation of the convolutions of the bellows, and is actuable to increase the volume of the bellows by axial movement of its end 65 relative to the other end 67 which is attached to an upturned flange 68 of part 57.

For responding to the commencement of a skid, tube 58 movably mounts two masses 69 and 70 having different predetermined periods of oscillation. Mass 69 is attached by an arm 71 to a first tube or bushing 72 which is rotatably movable about the externally cylindrical tube 58. Similarly, mass 70 is attached by an arm 73 to a second tube 74, which is also rotatably movable about tube 58. The mounting tubes 72 and 74, and their carried masses, are secured against axial movement by lock rings or other suitable stop means, typically represented at 75.

It may be assumed that when the vehicle is moving in a forward direction, unit 52 moves in a rightward direction as viewed in FIG. 4. Rearward movement of the two masses 69 and 70 may then be limited by engagement of the lower portions of those masses with an angle iron 76 attached to an upstanding portion 77 of part 57. Forward movement of masses 69 and 70 (to the right as viewed in FIG. 4) is yieldingly resisted by two coiled springs 78 and 79, which are connected at first ends to part 77 and at opposite ends to the two masses respectively. Mass 69 is designed to have a greater period of oscillation about axis 59 than does mass 70 (as by making the mass 69 substantially larger as shown). Thus, if weights 69 and 70 are moved forwardly against the resistance offered by springs 78 and 79, and are then released simultaneously, the weight 70 will return rearwardly into engagement with element 76 before the heavier weight 69 can return. This difference in oscillational period can also be attained by use of springs having different characteristics for the two masses, or by a combination of differences in the masses and spring characteristics. Mass 70 is retained against movement forwardly relative to mass 69, but is free for relative rearward movement. To achieve this result, mass 69 may carry a stop pin 80, fixed relative thereto and projecting laterally therefrom (parallel to axis 59) and into a slot 81 formed in mass 70 and disposed arcuately about axis 59. In the normal FIG. 4 positions of the masses, pin 80 engages the rearward end of slot 81, to prevent further forward movement of mass 70 relative to mass 69.

Mass 69 carries at one of its sides a toothed rack 82, disposed arcuately about axis 59, and engaged by a gear 83 which is mounted for rotation about an axis 84 relative to mass 70. Gear 83 may be connected to the inner turning element of a flexible drive shaft assembly represented at 85, whose opposite end is connected to gear 63, to turn gear 63 in correspondence with the rotation of gear 83. A mounting bracket 86 attached to mass 70 secures the flexible drive shaft assembly in a fixed position relative to mass 70, and in that way rotatably mounts gear 83 for its desired rotation about axis 84. The opposite end of drive shaft assembly 85 is connected to a bracket or mounting 87, secured to an extension 88 of tube 74, while the shaft of gear 63 may be journalled at its opposite side in a bearing 89. Thus, the gear 63 is journalled for rotation about an axis 90 relative to tube 74. Gear 63 projects through the side of tube 74, and through an aperture 91 in the side of tube 58, into engagement with the annular rack teeth of portion 62 of shaft 61. To discuss the operation of the FIGS. 3 to 5 device, assume that the motor vehicle having the unit 52 mounted thereon is advancing rapidly in a forward direction, that is, to the right as viewed in FIG. 4. If the operator then very suddenly applies the brakes of the vehicle, thereby slowing the vehicle frame and its attached part 57 at a high rate of deceleration, masses 69 and 70 are simultaneously actuated forwardly against the tendency of springs 78 and 79, say to the broken line positions represented in FIG. 4. During such movement of the masses, the pin 80 restrains mass 70 (which has the smaller period of oscillation) against forward movement at a rate faster than mass 69. As long as the deceleration continues at this very rapid rate, both of the masses will remain in their forwardly actuated positions. However, if the vehicle suddenly commences to skid forwardly, the effectiveness of the wheels in slowing the vehicle will fall off abruptly, and the rate of deceleration of the vehicle therefore will decrease rapidly. This allows the two masses 69 and 70 to be pulled rearwardly to their FIG. 4 positions by springs 78 and 79. Since the smaller mass 70 has a shorter period of oscillation about axis 59, that mass will return rearwardly before mass 69, and will thereby move gear 83 rearwardly along rack 82. This turns gear 83 about its individual axis 84, to correspondingly turn gear 63 about its axis 90 by virtue of the interconnection of the two gears through flexible drive shaft assembly 85. As gear 63 turns, it acts through teeth 62 to move shaft 61 axially to the left as viewed in FIG. 3, to thereby increase the volume of bellows 66, and in that way momentarily decrease the pressure in the hydraulic lines 55 of the braking system. Thus, the brakes are momentarily released, so that the wheels may regain rolling traction with the roadway, and again give the operator effective control over the movement of the vehicle. Subsequent return of mass 69 to its FIG. 4 position turns gears 83 and 63 in the reverse direction, to return bellows 66 to its initial normal condition, and thereby reapply the initial braking force at the various wheels.

Each time that a skidding condition commences, the apparatus will again respond in the manner discussed, to in that way always prevent the development of an extended skidding condition. As will be apparent, the proper responsiveness to a skid can be assured in a particular installation by proper predetermination of the masses of elements 69 and 70, as well as the forces exerted by springs 78 and 79, and the change in volume of bellows 66 resulting from a particular amount of relative movement of the two masses. The masses and springs are given such a relation that, under normal braking conditions, where the deceleration is decreased relatively slowly, rather than abruptly as in the case of a skid, the two masses 69 and 70 will be allowed by the slow decrease in deceleration to move gradually back toward their full line positions of FIG. 4 in unison, without mass 70 being permitted to lead mass 69 in such rearward movement.

A third form of the invention is shown diagrammatically in FIG. 6, in which one of the wheels of the vehicle is represented at 92, and turns about an axis 93. This wheel 92 has a series of radially extending circularly spaced spokes 94, between which light rays from an electric light bulb 95 pass to a photoelectric cell represented at 96. Cell 96 is connected into a series circuit including a battery 97 and the primary coil of a low frequency cut-off transformer 98 (i.e. a transformer whose primary reactance at an input frequency within the range of frequencies delivered by cell 96 does not substantially exceed the resistance of the primary circuit. In practice this will always be the case using conventional high resistance photocells). Each time that one of the spokes 94 of wheel 92 passes across and interrupts the beam of light from lamp 95 to photocell 96, this interruption causes the current flowing in the photocell circuit to momentarily decrease in value and then increase in value. Consequently, as the wheel turns, the rapid succession of spokes passing through the light beam causes a rapidly pulsating current to flow in the primary of the transformer 98. The resultant alternating current developed in the secondary of transformer 98 is conducted to a full wave rectifier bridge circuit 99, whose direct current output is filtered by a filter network consisting of a capacitor 103 and inductance 109, and is then passed through a resistor 100 which may preferably be inductive as represented in the drawing. Connected in parallel with resistor 100, there is a circuit containing a capacitor 101, relay solenoid 102, and an asymmetric resistance network consisting of resistance 110 in parallel with a diode rectifier 111 biased as indicated. The contacts 104 actuated by relay coil 102 are connected into a circuit including a battery 105, and a solenoid 106 which functions when energized to actuate a shaft 107 axially (upwardly as seen in FIG. 6) to increase the volume of a connected bellows 108. This bellows 108 is connected to the hydraulic braking system in the same manner as is bellows 66 of FIG. 3, to momentarily relieve the braking pressure in response to energization of solenoid 106.

With regard to the overall mode of operation of the FIG. 6 arrangement, let us first of all assume that the vehicle is moving along a roadway at a relatively rapid rate, and that consequently the interruptions of the light beam from lamp 95 by spokes 94 of wheel 92, as a result of the rotation of the wheel relative to the non-rotating lamp 95 and photoelectric cell 96, act to develop in the primary of transformer 98 a pulsating direct current. The secondary of the transformer produces an alternating current of the same frequency, which is rectified by rectifier circuit 99, is filtered by elements 103 and 109, and flows through resistor 100. This direct current of course can not flow through capacitor 101, but does act to develop a charge on the capacitor through resistance 110. If the brakes of the vehicle are applied very abruptly, with the vehicle moving at a rapid rate as discussed above, and the application of the brakes is sufficiently abrupt to send the car into a skid, then wheel 92 will be immediately locked in a non-rotating condition. This very sudden stopping of the wheel terminates the flow of current in both the primary and secondary of transformer 98, and therefore stops the flow of current in the output circuit of full wave rectifier 99. This allows capacitor 101 to suddenly discharge through the series circuit consisting of that capacitor, relay coil 102, diode rectifier 111, and resistor 100. The sudden flow of current through the coil 102, upon such discharging of the capacitor, causes contacts 104 to close and momentarily energize solenoid 106. Such energization of the solenoid actuates bellows 108 to momentarily decrease the pressure in the hydraulic braking system, and thus allow the wheels to regain rolling traction on the road surface. If the skid commences again at a subsequent time, the apparatus of FIG. 6 again serves to momentarily relieve the brake pressure.

Under normal driving conditions, the rates of acceleration and deceleration of wheel 92 are not sufficient to produce in coil 102 an output great enough to actuate contacts 104 to closed condition. The various components of the circuit are so selected as to produce a sufficient output for actuation of coil 102 only in response to the excessive rate of deceleration of the wheel which occurs when the wheel suddenly locks upon the commencement of a skid.

I claim:

1. The combination comprising a vehicle having traction units engaging a road surface with generally rolling contact, brakes for resisting turning of said units to thereby stop the vehicle, two masses mounted to the vehicle for forward movement relative thereto in response to rapid deceleration of the vehicle, means yieldingly urging said masses rearwardly relative to the vehicle to return the masses rearwardly upon a decrease in the rate of deceleration of the vehicle, said masses and said yielding means being constructed to give the two masses different periods of rearward returning movement when the deceleration of the vehicle decreases at a predetermined excessive rate, and brake releasing means responsive to differential rearward actuation of said masses upon said excessive decrease in deceleration to decrease the braking force exerted by the brake associated with at least one of said units, said masses being mounted for forward and rearward swinging movement about a common axis extending transversely of the vehicle, said brake releasing means including a gear movable with one of said masses, a rack on the other mass engaging the gear and adapted to turn it upon said differential actuation of the masses, a shaft extending essentially along said axis, means for moving the shaft along said axis in response to rotation of said gear, and a variable volume fluid container actuable by said shaft to increase the volume of the container upon said differential actuation of the masses, said brakes having actuating means operable by fluid pressure and communicating with said container to release the braking force upon said increase in volume of the container.

2. For use in a vehicle having traction units engaging a road surface with generally rolling contact, and having brakes for resisting turning of said units to thereby stop the vehicle, the combination comprising two masses to be mounted to the vehicle for forward movement relative thereto in response to rapid deceleration of the vehicle, means for yieldingly urging said masses rearwardly relative to the vehicle to return the masses rearwardly upon a decrease in the rate of deceleration of the vehicle, said masses and said yielding means being constructed to give the two masses different periods of rearward returning movement when the deceleration of the vehicle decreases at a predetermined excessive rate, and brake releasing means responsive to differential rearward actuation of said masses upon said excessive decrease in deceleration to decrease the braking force exerted by the brake associated with at least one of said units, said masses being adapted to be mounted for forward and rearward swinging movement about a common axis extending transversely of the vehicle, said brake releasing means including a gear movable with one of said masses, a rack on the other mass engaging the gear and adapted to turn it upon said differential actuation of the masses, a shaft extending essentially along said axis, means for moving the shaft along said axis in response to rotation of said gear, and a variable volume fluid container actuable by said shaft to increase the volume of the container upon said differential actuation of the masses, said brakes having actuating means operable by fluid pressure and communicating with said container to release the braking force upon said increase in volume of the container.

3. The combination comprising a movable carrier structure, first mass means and second mass means both carried by said structure and both displaceable with respect thereto by inertia upon acceleration of said carrier structure in a first direction, first resilient means and second resilient means yieldingly resisting movement of said first mass means and second mass means respectively relative to said carrier structure and from predetermined equilibrium positions with respect to said carrier structure upon said acceleration in said first direction, said resilient means returning said mass means toward said equilibrium positions upon a decrease in said acceleration, said first mass means and first resilient means being constructed to have a shorter oscillatory period than said second mass means and second resilient means so that said first mass means tends to move more rapidly than said second mass means relative to said carrier structure, and a motion limiting connection between said two mass means acting to limit said displacement of said first mass means relative to said second mass means upon said acceleration of the carrier part in said first direction, said first mass means being free for movement relative to said second mass means in the direction of said equilibrium positions upon an excessive decrease in said acceleration of said carrier structure, and means automatically actuable by and responsive to said returning movement of said first mass means relative to said second mass means.

4. A combination as recited in claim 3, in which said two mass means comprise two masses of different sizes mounted to swing about a common axis relative to said carrier structure, said two resilient means comprising two spring means urging said masses respectively in one direction about said axis and toward said equilibrium positions.

References Cited in the file of this patent
UNITED STATES PATENTS

| | | |
|---|---|---|
| 2,045,155 | Logan | June 23, 1936 |
| 2,107,823 | Hallot | Feb. 8, 1938 |
| 2,753,017 | Curl et al. | July 3, 1956 |
| 2,827,137 | Lockheed | Mar. 18, 1958 |

FOREIGN PATENTS

| | | |
|---|---|---|
| 772,500 | France | Aug. 18, 1934 |